April 15, 1969 R. D. SLAYTON 3,439,335
SEQUENCE DETECTOR
Filed April 6, 1966
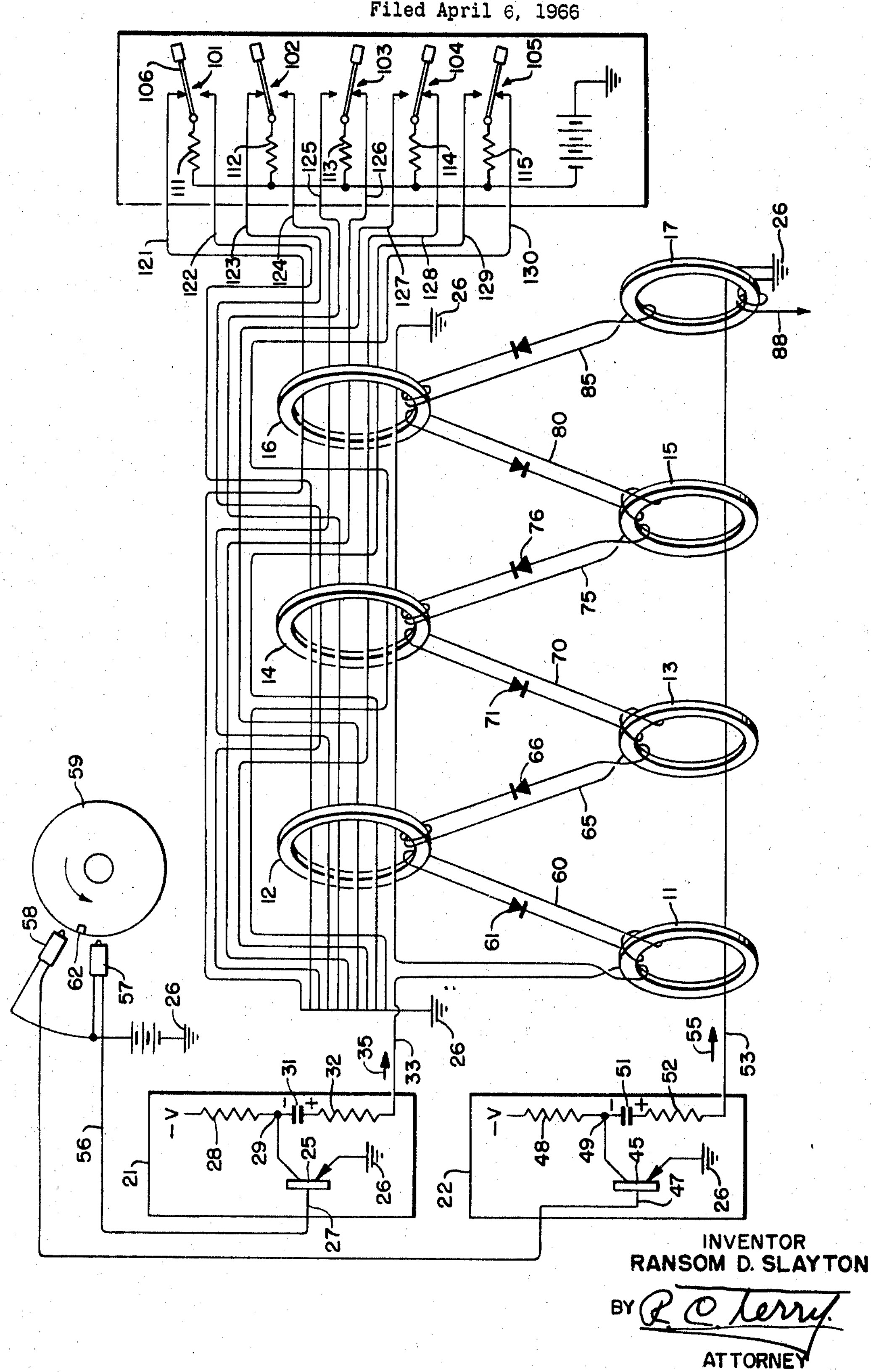
INVENTOR
RANSOM D. SLAYTON
BY R. C. Terry
ATTORNEY United States Patent Office 3,439,335

Patented Apr. 15, 1969

3,439,335
SEQUENCE DETECTOR

Ransom D. Slayton, Glenview, Ill., assignor to Teletype Corporation, Skokie, Ill., a coproration of Delaware Filed Apr. 6, 1966, Ser. No. 540,641
Int. Cl. G06f 7/02
U.S. Cl. 340—146.2 5 Claims

ABSTRACT OF THE DISCLOSURE

A sequence detection circuit uses a magnetic core shift register to combine the operation of detecting a sequence of predetermined permutation-coded characters with the decoding of those same characters. If the proper sequence of characters is received, a "set" condition is stepped through the register to the output stage. If the proper character in the sequence is not received at the proper time, at least one decoding wire threaded through the core associated with the desired character of the sequence carries an inhibiting current; so that the core cannot be "set" and the sequence fails.

Sequence detection circuits conventionally detect a sequence of signals with a plurality of memory devices, each of which remembers the receipt of one signal in the sequence and enables the succeeding memory device to recognize receipt of the next signal in the sequence. In order to recognize a sequence of permutation-coded characters, it is common practice to decode the characters and to generate the sequential signals from the decoded characters. This involves decoding and sequence recognition using separate electronic circuits with the necessary interconnections between these circuits for performing these functions.

It is an object of the present invention to successfully recognize a sequence of permutation-coded characters if the coded representations of these characters have combinations of code bits that are consistent with the code-bit representations of the characters in the sequence to be recognized.

It is another object of the present invention to combine the operation of detecting a sequence of predetermined permutation-coded characters with the decoding of these characters.

In accordance with the preferred embodiment of the invention as applied to a telegraph receiver, a magnetic-core shift register is provided having two magnetic cores per stage of the register. A plurality of conjugate pairs of code wires are selectively threaded through one core of each stage, so that each threaded core has one of the two wires of each pair threaded through it. Current always flows in one or the other of the two wires of each pair. The choice of which wire of each pair carries current is determined by the code representation of the character being received by the telegraph receiver. After a character is received, a "set" condition is stepped from one stage of the shift register to the next stage. A current flowing through any one of the wires that are threaded through a given core as the "set" condition is stepped into that core effectively inhibits the core from receiving the "set" condition. If no current flows through any of the wires threaded through the given core when a "set" condition is stepped into the core, the core is "set" to the "1" state. This indicates that the character then being received is the proper character in the sequence to be recognized. When this "set" condition reaches the end of the shift register, it produces an output indicating successful recognition of the sequence. If the character being received is not the proper character in the sequence, at least one wire that is threaded through this given core carries a current and the core is inhibited from assuming its "1" state, the "set" condition is lost, and the sequence fails.

A more complete understanding of the invention may be had by referring to the following detailed description when considered in conjunction with the accompanying drawing wherein a three-stage register is shown with five conjugate pairs of inhibit wires selectively threaded through one switch core for each stage of the register.

In accordance with the preferred embodiment of this invention, a ferrite-core shift register is adapted to recognize the sequence of characters in the form of permutations of binary bits. The individual ferrite cores which make up the shift register are of toroidal shape and are constructed of remanent magnetic material having a square hysteresis loop. Therefore, whenever a flux is induced to flow in one direction through a toroidal core, it continues to flow substantially undiminished until an opposing magnetomotive force that exceeds the coercive force of the core material is applied to the core. This magnetomotive force causes the flux to reverse its direction of flow in the core.

Referring now to the drawing, seven of these ferrite cores 11 through 17 are shown arranged as a three-stage shift register. Two identical, transistorized core drivers 21 and 22 generate current pulses which provide the magnetomotive force to cause reversal of the direction of the flux flowing within the cores.

*Core drivers*

Driver 21 uses a PNP transistor 25 with its emitter connected to a common terminal or ground 26. The base 27 of transistor 25 is normally maintained at some positive potential with respect to ground 26 in order to keep transistor 25 biased to its cut-off condition. The collector 29 of transistor 25 is connected through a load resistor 28 to a negative voltage source which provides operating power for the transistor 25. When transistor 25 is maintained in the cut-off condition, its collector 29 is maintained at substantially the voltage of the negative voltage source. When a negative voltage is momentarily applied to the base 27 of the transistor 25, transistor 25 becomes highly conductive and conducts current from ground 26 through resistor 28 to the negative voltage source causing the potential of collector 29 to migrate rapidly from the potential of the negative voltage source to the potential of ground 26 and to remain at ground potential so long as a negative voltage is applied to base 27 of transistor 25. As soon as base 27 is again maintained at a positive potential, transistor 25 ceases to conduct current and collector 29 returns to the potential of the negative voltage source.

One terminal of a coupling capacitor 31 is also connected to the collector 29 of transistor 25. The other terminal of capacitor 31 is connected through a current-limiting resistor 32 to one end of a driver wire 33 that is threaded through cores 11, 12, 14 and 16. The other end of driver wire 33 is connected to ground 26.

Whenever the collector 29 of transistor 25 is maintained at substantially the potential of the negative voltage source, a potential difference equal in magnitude to the potential of the negative voltage source is built up across capacitor 31 in the polarity shown in the drawing. When the potential of collector 29 is rapidly changed from the potential of the negative voltage source to the potential of ground 26, the negative terminal of capacitor 31 is also driven to ground potential. Since the voltage across a capacitor cannot change instantaneously, the positive terminal of capacitor 31 assumes a potential that is significantly more positive than ground potential. A transient current pulse then flows from ground 26 through transistor 25 and capacitor 31 through resistor 32 and wire 33 in the direction of the arrow 35 to ground 26 after passing through cores 11, 12, 14 and 16. This current rapidly diminishes to zero at a rate determined principally by the capacitance of capacitor 31 and the resistance of resistor 32. The voltage of the negative voltage source and the resistance of resistor 32 are so proportioned that this pulse of current passing through wire 33 in the direction of the arrow 35 generates sufficient magnetomotive force in cores 11, 12, 14 and 16 to exceed the coercive force of these cores.

Core driver 22 also comprises a PNP transistor 45, the emitter of which is also connected directly to ground 26. The base 47 of the transistor 45 is normally maintained at the same positive potential with respect to ground 26 in order to keep transistor 45 biased to the cut-off condition. The collector 49 of transistor 45 is connected through a load resistor 48 to the negative voltage source.

One terminal of a coupling capacitor 51 is also connected to the collector 49 of transistor 45. The other terminal of capacitor 51 is connected through a current-limiting resistor 52 to one end of a driver wire 53 that is threaded through cores 11, 13, 15 and 17. The other end of driver wire 53 is connected to ground 26. Whenever the base 47 of transistor 45 is momentarily driven to a negative potential, a pulse of current flows through wire 53 in the direction of the arrow 55.

In order to normally bias base 27 of transistor 25 to some positive potential, the base 27 is connected to a source of positive potential over a bias wire 56 and through the coil of a magneto 57. Similarly, base 47 of transistor 45 is connected to the source of positive potential through the coil of another magneto 58. In order momentarily to apply negative potential to base 27 or to base 47, magnetos 57 and 58 are arranged near the periphery of a nonmagnetic, rotating wheel 59. A slug 62 of magnetic material is embedded into the periphery of wheel 59. Slug 62 induces a voltage pulse in the coil of magnetos 57 or 58 whenever slug 62 passes in front of one of the magnetos.

In reality, two voltage pulses are generated in each magneto in one revolution of wheel 59. For example, one pulse is generated in magneto 58 as slug 62 approaches magneto 58 and another as slug 62 leaves magneto 58. One pulse is of positive polarity and the other is of negative polarity. Since they occur very closely in time, it is unimportant in this circuit which pulse is positive and which is negative. The negative one of these two voltage pulses generated in magneto 58 is of sufficient magnitude to neutralize the effect of the source of positive potential and momentarily to apply sufficient negative potential to base 47 to cause transistor 45 momentarily to conduct current and generate the desired current pulse on wire 53. Magneto 57 performs the same function for transistor 25.

The direction of rotation of wheel 59 and the positions of magnetos 57 and 58 are arranged so that the current pulse on wire 33 follows the current pulse on wire 53 more closely in time than the current pulse on wire 53 follows the current pulse on wire 33. This permits input circuit operations to occur after the current pulse on wire 33 and before the current pulse on wire 53.

*Shift register*

To start a set condition ("1" state) traveling through the shift register, base 27 of transistor 25 in core driver 21 is momentarily driven to a negative voltage. The resultant current pulse in driver wire 33 then sets a "1" state (set condition) into core 11 and sets cores 12, 14, and 16 to the "0" state if these cores are not already in that state. Thereafter, a negative voltage is momentarily applied to base 47 of transistor 45 in core driver 22. The resultant current pulse on wire 53 resets core 11 to the "0" state and also resets cores 13, 15, and 17 to the "0" state if they are not already in that state. This change of state from "1" to "0" in core 11 is accompanied by a reversal of the flux flowing in core 11. The reversal of the direction of flow of the flux in core 11 generates a potential in that part of a coupling wire 60 which is threaded through core 11, causing a pulse of current to flow in coupling wire 60 in the direction of a diode 61. Coupling wire 60 is also threaded through core 12, and this pulse of current tends to develop a magnetomotive force in core 12. The numbers of turns of coupling wiring 60 wound around cores 11 and 12 are proportioned so that the current pulse generated in wire 60 by the transition of core 11 from the "1" state to the "0" state is sufficient to cause core 12 to change from the "0" state to the "1" state. The purpose of diode 61 is to prevent current from flowing in wire 60 when core 11 changes from the '0" state to the "1" state.

Shortly after the pulse of transfer current appears on driver wire 53, base 27 of transistor 25 in core driver 21 again momentarily is driven to a negative voltage. This causes another pulse of transfer current to be generated in driver wire 33 in the direction of the arrow 35. This pulse of current on driver wire 33 passes through core 11, setting core 11 to the "1" state. This same pulse of current also passes through core 12, resetting core 12 from the "1" state to the "0" state. A coupling wire 65 is threaded through cores 12 and 13. The transition of core 12 from the "1" state to the "0" state is accompanied by a flux reversal in core 12 which generates a pulse of current in coupling wire 65 in the direction of a diode 66. This current pulse in coupling wire 65 is of sufficient magnitude to set core 13 to the "1" state. At this point, cores 11 and 13 are in the "1" state and all the other cores are in the "0" state.

The base 47 of transistor 45 in core driver 22 is then momentarily driven to a negative voltage causing another pulse of current to flow in driver wire 53 in the direction of the arrow 55. This pulse of current in driver wire 53 changes the state of cores 11 and 13 from "1" to "0." The transition of core 11 from "1" to "0" causes core 12 to be set to the "1" state. The transition of core 13 from "1" to "0" generates sufficient current in a coupling wire 70 in the direction of a diode 71 to set core 14 to the "1" state.

Shortly after cores 12 and 14 have been set to the "1" state by the transfer of the state contained in cores 11 and 13, base 27 of transistor 25 in core driver 21 is again momentarily driven to a negative potential. This gives rise to another pulse of transfer current on the wire 33 in the direction of arrow 35 which sets core 11 to the "1" state and resets cores 12 and 14 to the "0" state. When cores 12 and 14 are changed from the "1" state to the "0" state, the current pulses thus generated in coupling wires 65 and 75 in the direction of diodes 66 and 76 cause cores 13 and 15 to be set to the "1" state. At this time cores 11, 13 and 15 are in the "1" state, and cores 12, 14, 16 and 17 are in the "0" state.

Base 47 is again momentarily driven to a negative voltage causing a pulse of transfer current to flow in wire 53 in the direction of arrow 55, transferring the "1" state from cores 11, 13 and 15 to cores 12, 14, and 16 by means of coupling wires 60, 70, and 80. Core driver 21 is then caused to issue another pulse of transfer current on wire 33 which sets core 11 to the "1" state and cores 12, 14 and 16 to the "0" state. The resetting of cores 12, 14 and 16 from the "1" state to the "0" state causes cores 13, 15 and 17 to be set to the "1" state by means of coupling wires 65, 75 and 85.

A final transfer pulse then appears on wire 53 in the direction of arrow 55 and sets cores 11, 13, 15 and 17 to the "0" state. The resetting of core 17 to the "0" state from the parevious "1" state is accompanied by sufficient flux reversal in core 17 to generate a significant voltage pulse on an output wire 88 which is threaded through core 17. The voltage pulse thus generated on output wire 88 indicates that the first set condition that was initially introduced into core 11 has now reached core 17.

It can be seen that in this shift register, a set condition introduced into core 11 progresses to cores 12, 13, 14, 15, 16 and 17 in that order upon the generation of pulses of transfer current by first one, then the other of core drivers 21 and 22.

*Decoding*

Permutation-coded characters are made up of groups of binary bits. For example, an alphabetic character can be positively identified by a permutation of five binary bits. These binary bits are customarily designated as "set" or "reset," "1" or "0," "mark" or "space," "current," or "no-current" etc. and the groups of bits are referred to as characters, columns, binary words, etc.

In the preferred embodiment of this invention a steady stream of characters in the form of permutation-coded groups of binary bits is received by an electronic circuit. This circuit samples the several bits of each group to determine whether or not the group represents a desired code combination or character, and if so, whether this character appears in a desired sequence with other characters. These groups of binary bits can be obtained from a telegraph channel, from a data processing machine or from a machine that reads perforated data processing or telegraphic tape. Such a tape reader is shown in Patent No. 3,014,092, issued Dec. 19, 1961, to J. L. DeBoo. When a group of bits is obtained from a tape reader such as that shown in the above-mentioned DeBoo patent, a magneto wheel such as wheel 59 is rotated through one revolution. The magneto wheel 59 can be driven by any shaft in the tape reader that rotates through some angle of arc for each group of binary bits sensed in the perforated tape read by the tape reader. Binary bits represented by holes or the absence thereof in the tape are converted by the tape reader into mechanical motions which can be used to operate a plurality of electrical contacts.

In the drawing, five transfer switches 101 to 105 are shown. The swingers of these transfer switches are operated by the mechanical movements available in the tape reader in response to the sensing of perforations in the tape. In perforated data tape, groups of bits are arranged in columns across the width of the tape. The No. 1 bit of each group is usually positioned adjacent one edge of the tape. The No. 2 bit is usually positioned next to the No. 1 bit, and so on toward the opposite edge of the tape. A bit in the tape can be represented by a hole ("mark" or "1" state) in a given location in the tape or by an absence of a hole ("space" or "0" state) in the given location. The No. 1 bit of each group always occurs at a given distance from one edge of the tape. The location of the No. 1 bits in a tape is called the No. 1 (or first) level, the No. 2 bits occur in the No. 2 (or second) level in the tape, and so on for each bit of each group. The No. 1 level in the tape, when read by the tape reader, operates transfer switch 101 by moving the swinger 106 upwardly into engagement with the upper throw ("1" state) or downwardly to the lower throw ("0" state) of switch 101. When a hole ("1" state) in the No. 1 level of the tape causes swinger 106 to touch the upper throw of switch 101, a circuit is completed from a source of negative potential through a resistor 111 and the upper throw of switch 101 over a wire 121 (which is threaded through core 16 and bypasses cores 12 and 14) to ground 26. When this circuit is completed, current flows through wire 121. The value of the resistance of resistor 111 is chosen to allow sufficient current to flow through wire 121 to drive core 16 to the "0" state. Hence, whenever switch 101 is in the "1" state, core 16 cannot be set to the "1" state. Therefore, when level No. 1 of the tape reader senses a "1," core 16 is inhibited from assuming the "1" state. However, cores 12 and 14 are not inhibited by a "1" state in the No. 1 level in the code group being sensed by the tape reader since wire 121 bypasses cores 12 and 14.

Whenever level No. 1 of the code group being sensed in the tape reader is a "0," swinger 106 is held in contact with the bottom throw of transfer switch 101. Current then flows from ground 26 through wire 122, into swinger 106, and through resistor 111 to the negative voltage source. Wire 122 is threaded through cores 12 and 14 but bypasses core 16. Therefore, when the No. 1 level of the tape reader senses a "0," cores 12 and 14 are inhibited from assuming the "1" state but core 16 can assume the "1" state.

The wires 123 to 130 that are associated with the other four levels of the code are also selectively threaded through cores 12, 14 and 16 as shown in the drawings. As an example of the operation of this sequence detector the threading of wires 121 through 130 through cores 12, 14 and 16 has been arranged so that the circuit will recognize the sequential receipt of the alphabetic characters "A," "B" and "C" when encoded in the Baudot telegraphic code.

In the Baudot telegraphic code, the alphabetic character "A" is represented by a "1" state in the first and second levels and by a "0" state in the third, fourth and fifth levels. Therefore, wires 122, 124, 125, 127 and 129 have been threaded through core 12 which is bypassed by wires 121, 123, 126, 128 and 130. Since the existence of a current flowing through any one of wires 122, 124, 125, 127, or 129 is sufficient to inhibit core 12 from assuming the "1" state, core 12 is free to assume the "1" state upon the passage of a current pulse in coupling wire 60 in the direction of diode 61 only when no current flows in these wires. This occurs only when levels 1 and 2 are "1" state bits and when levels 3, 4 and 5 are "0" state bits. Therefore, core 12 recognizes only receipt of the alphabetic character "A" in the Baudot code.

Similarly, core 14 has been wired to recognize the Baudot coded representation of the alphabetic character "B," and core 16 has been arranged to recognize the alphabetic character "C."

*Operation*

To begin a cycle of operation of the sequence detector, the slug 62 in wheel 59 passes in front of magneto 57 and generates a negative voltage pulse on wire 56. This negative voltage pulse causes transistor 25 of core driver 21 to conduct current, sending a pulse of transfer current over driver wire 33 in the direction of arrow 35. This current pulse sets core 11 to the "1" state and sets cores 12, 14 and 16 to the "0" state. In the period of time during which the slug is traveling from magneto 57 to magneto 58, the first character in the sequence is sensed by the tape reader. The tape reader positions transfer switches 101 to 105 according to the permutation of the bits in the code group sensed by the tape reader. Assuming that this code group to which transfer switches 101 to 105 are set corresponds to the alphabetic character "A" in the Baudot code, no current flows through wires 122, 124, 125, 127 and 129. When slug 62 passes magneto 58, the negative voltage applied to transistor 45 causes a current pulse to flow in driver wire 53 in the direction of the arrow 55. This resets core 11 from the "1" state to the "0" state, generating a current pulse on coupling wire 60 in the direction of diode 61. The current pulse in coupling wire 60 sets core 12 to the "1" state. This signifies reception and recognition of the alphabetic character "A."

Further rotation of wheel 59 causes slug 62 again to pass magneto 57. When slug 62 passes magneto 57, it gives rise to a current pulse on driver wire 33 which sets core 11 to the "1" state and resets core 12 to the "0" state. The resetting of the core 12 to the "0" state generates a current pulse in coupling wire 65 which sets core 13 to the "1" state.

During continued rotation of wheel 59 transfer switches 101 to 105 are positioned according to the next code group in the tape being read by the tape reader. If this next permutation code combination is representative of the alphabetic character "B," there is no current flowing in any wires threaded through core 14.

Passage of slug 62 in front of magneto 58 causes a current pulse to flow in wire 53 that resets cores 11 and 13 to the "0" state. The resetting of core 13 to the "0" state causes a current pulse to flow in coupling wire 70 setting core 14 to the "1" state. The current pulse generated on coupling wire 60 at this time when core 11 is reset to the "0" state fails to set core 12 to the "1" state since wires 124, 127 and 129 which are threaded through core 12 carry current when transfer switches 101 to 105 are set according to the permutation code represenation of the alphabetic character "B."

The presence of a "1" state in core 14 indicates the successful receipt and recognition of a code combination representative of the alphabetic character "A" followed by a code combination representative of the character "B."

When slug 62 on wheel 59 passes in front of magneto 57, another current pulse passes over driver wire 33 setting core 11 to the "1" state and resetting core 14—now in the "1" state—to the "0" state. This generates a current pulse in coupling wire 75 which sets core 15 to the "1" state. Since cores 12 and 16 already were in the "0" state when the current pulse passed over wire 33, only cores 11 and 15 are now in the "1" state.

Assuming the next code combination in the tape represents the alphabetic character "C," transfer switches 101 to 105 are set according to the Baudot code representation of the alphabetic character "C" during the time that slug 62 moves from magneto 57 to magneto 58. If transfer switches 101 to 105 are set to the Baudot code representation of the letter "C," none of the wires 121, 124, 126, 128 or 129 threaded through core 16 carries current. When slug 62 passes in front of magneto 58, the ensuing current pulse on wire 53 resets cores 11 and 15 from the "1" state to the "0" state. When core 15 is reset, the current pulse on coupling wire 80 sets core 16 to the "1" state. When core 11 is reset, the current pulse on coupling wire 60 is ineffective to set core 12 since core 12 is inhibited by the current flowing in wires 122, 125 and 127. Current also flows in wires 122, 123, 125 and 130 threaded through core 14 but has no effect on the operation at this time.

Slug 62 then passes magneto 57 causing another current pulse to pass through driver wire 33 which resets core 16 to the "0" state. When core 16 is reset from the "1" state to the "0" state, the current pulse generated on coupling wire 85 sets core 17 to the "1" state. When core 17 is set from the "0" state to the "1" state, a negative voltage pulse is generated on output wire 88. When slug 62 again passes in front of magneto 58, the resulting current pulse on driver wire 53 resets core 17 to the"0" state causing a positive voltage pulse to appear on output wire 88. Either of these voltage pulses on output wire 88 indicates successful receipt and recognition of a sequence of code combinations representing the alphabetic characters "A," "B," and "C."

If any characters other than "A," "B," or "C" are sensed by the tape reader or if any of the characters "A," "B," or "C" are sensed in the wrong order, the sequence will fail and core 88 will not be set to the "1" state. For example, if any permutation other than that representative of the alphabetic character "A" is sensed by the reader, transfer switches 101 to 105 are positioned so that at least one of the wires 122, 124, 125, 127 and 129 threaded through core 12 carries a current of sufficient magnitude to prevent the pulse of current on coupling wire 60 from setting core 12 to the "1" state. Therefore, core 12 remains in the "0" state, indicating failure of the circuit to recognize a permutation code combination representative of the alphabetic character "A." If core 12 remains in the "0" state, core 13 remains in the "0" state when a pulse of current flows in wire 33 in the direction of arrow 35. If the tape reader then senses a "B," no pulse is available on coupling wire 70 to set core 14 to the "1" state because core 13 is still in the "0" state when the next current pulse appears on wire 53.

It can be seen that this sequence detection circuit can be wired to recognize a sequence of any two or more characters. For example, cores 14 and 16 could also be wired to decode the character "A." Then a voltage would be generated on output wire 88 after receipt of three successive "A's."

Although only one embodiment of the invention is shown in the drawings and described in the foregoing specification, it will be understood that invention is not limited to the specific embodiment described, but is capable of modification and rearrangement and substitution of parts and elements without department from the spirit of the invention.

What is claimed is:

1. A sequence detector for recognizing receipt of a predetermined sequence of characters each in the form of a permutation combination of binary bits comprising:
   - a first memory device having two stable states;
   - means for setting the first memory device to one of its two stable states;
   - means individual to each binary bit for inhibiting the setting of the first memory device to said one of its stable states when any bit of the permutation combination received is inconsistent with the first character of the sequence;
   - a second memory device having two stable states;
   - means responsive to the first memory device in said one of its stable states for setting the second memory device to one of its to stable states;
   - means individual to each binary bit for inhibiting the setting of the second memory device to said one of its stable states when any bit of the permutation combination received is inconsistent with the second character of the sequence; and
   - means responsive to the second memory device in said one of its stable states for indicating that the first and second characters in the sequence have been received in their proper order and with no other intervening characters.

2. A sequence detector according to claim 1 wherein the means for setting the second memory device to one of its two stable states comprises:
   - means for setting the first memory device from said one of its stable states to the other of its stable states;
   - a first interim memory device having two stable states;
   - means for setting the first interim memory device to one of its two stable states in response to the setting of the first memory device from said one of its stable states to the other of its stable states;
   - means for setting the first interim memory device from said one of its stable states to the other of its stable states; and
   - means for setting the second memory device to said one of its two stable states in response to the setting of the first interim memory device from said one of its stable states to the other of its stable states.

3. A sequence detector according to claim 1 wherein the memory devices comprise magnetic switch cores.

4. A sequence detector according to claim 3 wherein the means for setting a memory device to one of its two stable states comprises an electrical conductor passing through the core and means for passing a pulse of current through the electrical conductor.

5. A sequence detector according to claim 4 wherein the means individual to each bit for inhibiting the setting of a switch core to one of its two stable states comprises an electrical conductor passing through the core and means for passing a steady current through the electrical conductor in a direction to set the switch core to the other of its stable states.

(References on following page)

References Cited

UNITED STATES PATENTS

| | | | |
|---|---|---|---|
| 3,245,035 | 4/1966 | English | 340—146.2 |
| 3,243,775 | 3/1966 | English | 340—146.2 |
| 3,327,290 | 6/1967 | English | 340—164 X |
| 3,056,116 | 9/1962 | Crane. | |
| 3,267,428 | 8/1966 | Swanson | 340—146.2 |
| 3,235,718 | 2/1966 | Walendziewicz | 235—177 X |
| 3,239,810 | 3/1966 | Jacoby | 340—146.2 |
| 3,252,142 | 5/1966 | Takenaka | 340—164 |

MALCOLM A. MORRISON, *Primary Examiner.*

E. J. WISE, *Assistant Examiner.*

U.S. Cl. X.R.

235—177; 340—164, 174